Patented July 17, 1923.

1,462,064

UNITED STATES PATENT OFFICE.

ALBERT ANDREW KELLY, OF LONDON, ENGLAND.

PROCESS FOR THE PRODUCTION OF SODIUM DECABORATE FROM BORON ORES.

No Drawing.   Application filed February 17, 1922.   Serial No. 537,306.

*To all whom it may concern:*

Be it known that I, ALBERT ANDREW KELLY, a subject of the King of Great Britain, residing in London, W. C. 1., England, have invented certain new and useful Improvements in a Process for the Production of Sodium Decaborate from Boron Ores, of which the following is a specification.

This invention relates to an improved process for the production of sodium decaborate direct from boron ores.

According to the process forming the subject of my co-pending application for Letters Patent Serial No. 410,785, sodium decaborate is produced directly from boron ores by subjecting the said ore, in a powdered condition and mixed with water, to the action of carbon dioxide.

We have found that sodium decaborate may be produced directly from boron ores by treatment of the ore in a raw or calcined state, and mixed with water, with sulphur dioxide.

With sulphur dioxide, if employed according to the process forming the subject of the application for Letters Patent before referred to, boric acid is obtained and the sodium contained in the ore, boronatrocalcite, goes into solution as sodium sulphite and in certain circumstances also as sodium bissulphite, thus not being rendered directly available for the formation of the decaborate as is the case where carbon dioxide is employed.

By using a calculated quantity of sulphur dioxide it is true it is possible to arrive at sodium decaborate according to the following equation:—

(1)  $Na_2O + 2CaO + 5B_2O_3 + 2SO_2 =$
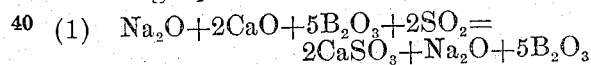

An excess of sulphurous acid, which is practically unavoidable and is also necessary for the decomposition of the mineral, has a prejudicial effect so far as the yield of decaborate is concerned as the decomposition of the ore proceeds, as far as boric acid, as shown by the following equation.

(2)  $Na_2O + 2CaO + 5B_2O_3 + 3SO_2 =$
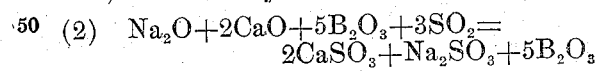

Further investigations in regard to the capacity for reaction of the sodium sulphite obtained according to equation (2) with boronatrocalcite, have shown that decomposition of the latter takes place according to equation:—

(3)  $Na_2O + 2CaO + 5B_2O_3 + 2Na_2SO_3 =$
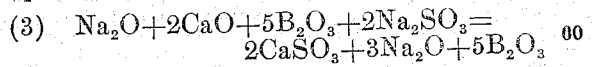

This produces a borate which lies between borax and metaborate.

This compound lacks the boric acid required to obtain the desired decaborate. The boric acid necessary for this is however, obtained at the same time according to the second of the aforesaid equations, thus showing a method of decomposing boronatrocalcite with sulphur dioxide whereby sodium decaborate is formed direct, without loss of $SO_2$, or requiring soda to be specially added. There is also obtained a reaction liquor of such a degree of concentration that on cooling the decaborate crystallizes directly therefrom. The reaction therefore is best carried out in two steps, the first of which proceeds according to the equation (2)—

(2)  $Na_2O + 2CaO + 5B_2O_3 + 3SO_2 =$
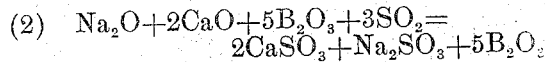

and the second of which proceeds according to the equation below:

(4)  $2(Na_2SO_3 + 5B_2O_3) + Na_2O + 2CaO +$
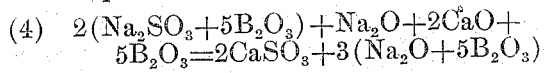

In working upon a large scale the following method of procedure could be adopted:—

Into a mixture of 100 parts boronatrocalcite (40% $B_2O_3$) and 400 parts of water, sulphur dioxide is first introduced. The sulphur dioxide may conveniently be obtained by burning sulphur or pyrites. As soon as the separation of boric acid according to equation (2), is completed the supply of $SO_2$ is stopped and a calculated quantity of boronatrocalcite is added to the reaction mixture and the latter heated, when the decomposition of the second quantity of boronatrocalcite proceeds forming sodium decaborate. The hot solution obtained is immediately capable of crystallization but by repeating the operation the solution may be further concentrated. The liquor is cooled off in the usual way and the decaborate crystals deposited are separated from the mother liquid and dried.

From such sodium decaborate liquors borax can of course be produced provided the necessary quantity of alkali is added to the liquor and the latter left to crystallize.

Claims:

1. A process for the production of sodium decaborate, comprising mixing boron ore with water, heating the mixture and treating the mixture with sulphur dioxide so that on cooling the decaborate is obtained therefrom.

2. A process for the manufacture of sodium decaborate, comprising treating a mixture of boron ore and water first with sulphur dioxide in excess producing boric acid and sulphites; then before the necessary heating of the liquor adding a further calculated quantity of boron ore thereto in such proportion that on cooling decaborate is formed.

In witness whereof I have hereunto set my hand in the presence of two witnesses.

ALBERT ANDREW KELLY.

As witnesses:
 ROBERT B. R. WALKER,
 GERTRUDE E. L. PHILLIPS.